United States Patent [19]

Nattel et al.

[11] Patent Number: 5,015,804
[45] Date of Patent: May 14, 1991

[54] ELECTRICAL CABLE CONNECTOR FOR SEALING AN ARMOURED ELECTRICAL CABLE

[75] Inventors: William Nattel, Montreal; Alain Michaud, St. Luc, both of Canada

[73] Assignee: Commander Electrical Materials, Inc.

[21] Appl. No.: 498,796

[22] Filed: Mar. 26, 1990

[51] Int. Cl.⁵ .............................................. H02G 15/06
[52] U.S. Cl. .............................. 174/65 SS; 174/77 R
[58] Field of Search ..................... 174/65 SS, 76, 77; 285/158, 161, 343

[56] References Cited

U.S. PATENT DOCUMENTS

| | | | |
|---|---|---|---|
| 3,833,754 | 9/1974 | Philibert | 174/65 SS |
| 4,015,329 | 4/1977 | Hutchison | 174/65 SS |
| 4,301,325 | 11/1981 | Hutchison | 174/65 SS |
| 4,515,991 | 5/1985 | Hutchison | 174/65 SS |
| 4,692,561 | 9/1987 | Nattel | 174/65 SS |
| 4,692,562 | 9/1987 | Nattel | 174/65 SS |

FOREIGN PATENT DOCUMENTS 2106336  4/1983  United Kingdom ............ 174/65 SS

Primary Examiner—Leo P. Picard
Assistant Examiner—David A. Tone
Attorney, Agent, or Firm—G. H. Telfer

[57] ABSTRACT

An electrical cable connector seals an armoured electrical cable entering an explosion proof enclosure. The connector has less parts than existing connectors and takes less time to seal and assemble. The connector includes a rigid substantially tubular body portion with external threads at each end, the body portion has a passage therethrough for insulated conductors of an armoured electrical cable, an internal curved shoulder at one end of the body portion, and an internal taper at the other end of the body portion. A substantially tubular seal made from firm resilient elastomeric material passes over the armoured electrical cable, the seal has a substantially cylindrical inner surface, a frusto-conical outer surface extends from a small end, having a curved lip at the small end where the outer surface and the inner surface join, the curved lip is adapted to match the internal curved shoulder of the body portion. A first threaded cover holds the tubular seal to the body portion, a substantially tubular adaptor fits over the installed conductors and has an internal taper and an external shoulder that forms a sealant cavity between the two internal cavities, and a second threaded cover holds the tubular adaptor to the body portion.

6 Claims, 1 Drawing Sheet

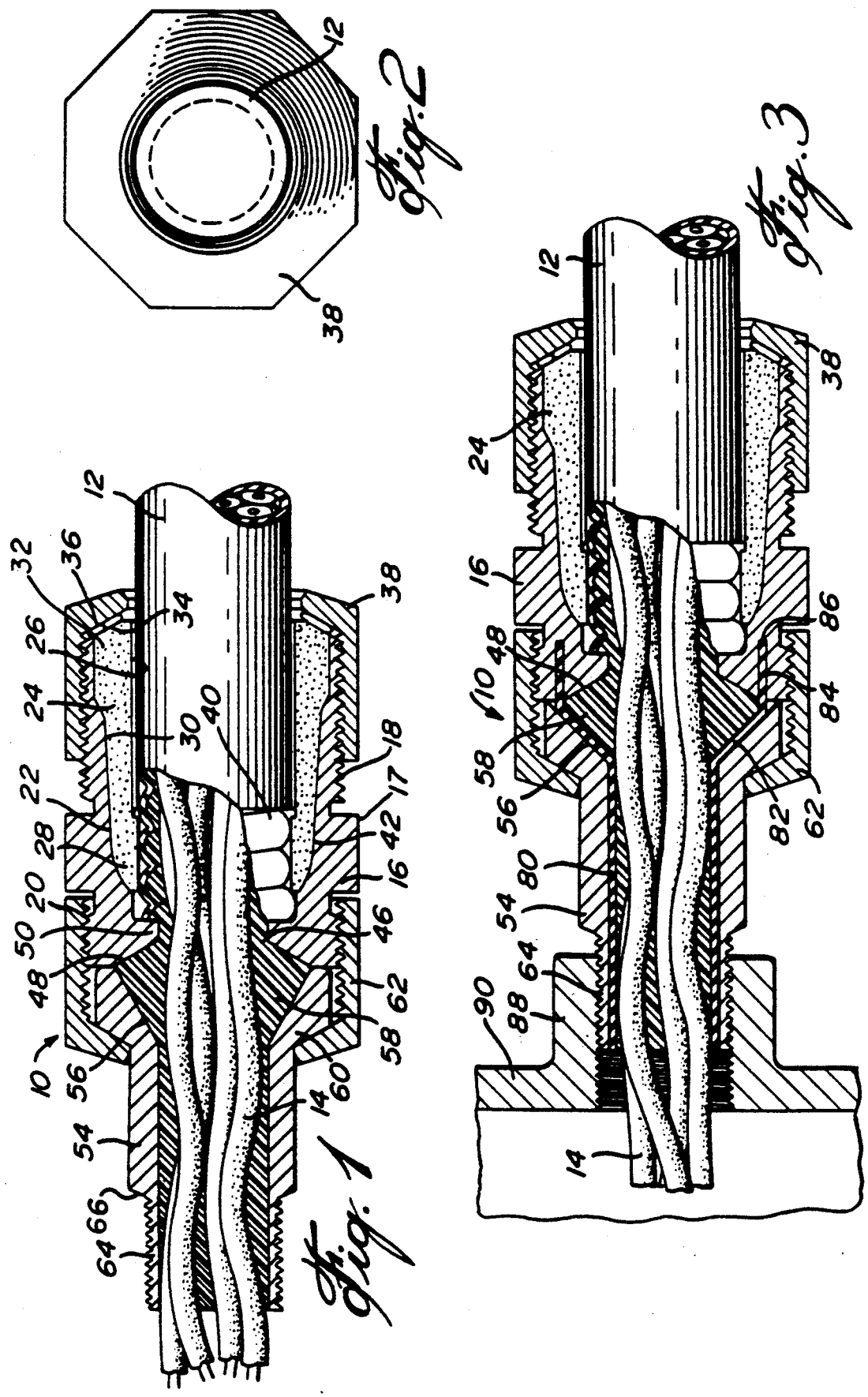

ELECTRICAL CABLE CONNECTOR FOR SEALING AN ARMOURED ELECTRICAL CABLE

The present invention relates to a connector for an installation where an armoured electrical cable connects to an enclosure. More specifically, the invention relates to connectors of the type used to connect armoured electrical cables to a fixed partition of an explosion proof enclosure.

The use of armoured electrical cables with an elastomer sheath covering is common in today's markets, and these types of cables have been approved for use with explosion proof enclosures. In order to provide the connection or joint between the cable and the enclosure, special connectors have to be used. These connectors have to undergo stringent tests in which hazardous conditions are simulated.

During the test, the connector is assembled to a six foot length of cable, and then connected to an explosion proof enclosure. A mixture of an explosive gas and air is pumped into the enclosure in a measured ratio of gas and air to ensure that the mixture will ignite at the lowest possible temperature. Two plastic bags, one sealed against the connector entering the enclosure, the other sealed at the other end of the cable, are installed and filled with the same gas mixture. The whole assembly is placed in an explosion proof room, and the mixture inside the enclosure is ignited. The connector passes the test if the explosion is not propagated to either of the two bags.

The connectors presently used for this type of installation have a special sealing adaptor, which is cumbersome to install, and the adaptors are expensive and unwieldy. Recently some connectors have appeared on the market which do not require the additional sealing adaptor, but use an epoxy resin mixture. These types of adaptors are complicated in construction, and expensive to manufacture. Also, once the cable has been placed inside the connector, it can no longer be removed, even before the epoxy has cured.

It is an aim of the present invention, to provide an electrical cable connector which has fewer parts than existing connectors used for connecting elastomer sheath covered armoured type cables to an explosion proof enclosure. It is a further aim to provide a connector that is less expensive to manufacture, and easier to seal and assemble. It is also an aim of the present invention to provide a connector which allows the cable to be removed from the enclosure after assembly, without having to cut the cable.

The present invention provides a connector for sealing an electrical cable within an explosion proof enclosure, which incorporates a tubular seal made from firm resilient elastomeric material that seals to the cable sheath, and grounds the cable armour. An epoxy compound surrounds the insulated conductors from the end of the cable sheath, seals around each of the conductors up to the tubular seal, thus preventing hot gases from escaping in the event of an explosion.

In a preferred embodiment, the connector has a threaded cover, or nut at one end, which seals the tubular seal to the cable sheath before the application of epoxy, and a second threaded cover or nut for fitting over the end of the cable and attaching to a rigid tubular body portion to contain the epoxy between and around the conductors, thus providing a completely sealed unit. In yet a further embodiment, the second threaded cover can be removed, a tubular adaptor that connects to the enclosure can also be removed, allowing the end of the cable to be removed from the enclosure and replaced if necessary, without having to cut the cable, or break the seal.

The present invention provides an electrical cable connector for sealing an armoured electrical cable entering an explosion proof enclosure, comprising a substantially rigid tubular body portion with external threads at each end, the body portion having a passage there through for insulated conductors of an armoured electrical cable, an internal curved shoulder at one end of the body portion, and an internal taper at the other end of the body portion; a substantially tubular seal made from firm resilient elastomeric material, to pass over the armoured electrical cable, the seal having a substantially cylindrical inner surface, a frusto-conical outer surface extending from a small end, having a curved lip at the small end where the outer surface and the inner surface join, the curved lip adapted to match the internal curved shoulder of the body portion; a first threaded cover means to engage the external threads at the end of the body portion with the internal curved shoulder to push against the tubular seal so that the curved lip is swivelled inwards and is adapted to contact the armoured electrical cable; a substantially tubular adaptor to fit over the insulated conductors of the armoured electrical cable, having an internal taper and an external shoulder at one end to adjoin the end of the body portion with the internal taper to form a sealant cavity between the two internal tapers; means for attachment to an aperture in the partition at the other end of the tubular adaptor, and a second threaded cover means to engage the external threads at the end of the body portion having the internal taper, to hold the tubular adaptor to the body portion.

In a further embodiment, an internal seal is provided within the tubular adaptor to permit the second threaded cover and the tubular adaptor to be removed after the sealant has been inserted into the aperture without affecting the seal.

In drawings which illustrate embodiments of the invention,

FIG. 1 is a cross sectional longitudinal view of one embodiment of an electrical cable connector according to the present invention;

FIG. 2 is an end view of the cable connector shown in FIG. 1;

FIG. 3 is a cross sectional longitudinal view of another embodiment of a cable connector according to the present invention.

The connector shown in FIGS. 1 and 2, has substantially two parts, a first part which has a tubular seal made from firm resilient elastomeric material to seal to the cable sheath and ground the cable armour, and which seals the conductors protruding from the end of the cable. The sealant is preferably an epoxy which hardens to prevent gases passing through the connector.

The first part of the connector is similar to that shown in my U.S. Pat. Nos. 4,692,561 and 4,692,562. These patents show an elastomeric seal for sealing a cable passing through a partition, and also grounding the armoured portion of the cable. A connector is also shown including the seal, and provision is made to use the seal and the connector with a wider range of cable sizes as the seal may be compressed to fit more than one cable size.

The electrical connector 10, as shown in FIGS. 1 and 2, has an electrical cable 12, entering at one end, and at the other end has insulated conductors 14 which feed inside an explosion proof enclosure. The connector 10, has a rigid hollow body portion 16, the largest exterior surface 17 has two or more flat opposing surfaces for gripping with a wrench or other suitable tool. In a preferred embodiment, the exterior surface 17 is hexagonal. At the end of the connector 10, adjacent the cable 12, there is an exterior thread 18, and a further exterior thread 20 at the other end. On the cable end of the body portion 16, there is a cavity 22 having an internal curved shoulder into which a substantially tubular seal 24 fits. This tubular seal 24 is of the same construction as that disclosed in U.S. Pat. Nos. 4,692,561 and 4,692,562. The seal 24 is in the form of a bushing made from a firm resilient elastomeric material, such as a synthetic rubber. It has a substantially tubular body with a cylindrical inner surface 26 extending from a small end 28, which has an exterior curved lip. The lip joins the inner surface 26, and a frusto-conical outer surface 30, together at the small end 28. The frusto-conical outer surface 30 is arranged to fit within the internal curved shoulder of cavity 22 of the body portion 16 so that when the seal 24 is pushed into the body portion 16, the small end 28 is pushed down to seal and grip the cable armour 40. At the other end, which is the large end 32, a tapered surface 34 extends from the large end 32, and is designed to mate with a pressure ring 36, or if this ring 36 is not used, then with a threaded cover or gland nut 38.

As can be seen in FIG. 1, the outer sheath of the cable is cut back for about half an inch, exposing the cable armour 40. Surrounding the curved lip of the small end 28 are grounding fingers 42, which ground the cable armour 40 directly to the tubular body portion 16. Although grounding fingers 42 are disclosed herein, it will be apparent to those skilled in the art that a conductive elastomeric material may be used for the seal 24. Such a material would provide grounding without fingers 42 being required.

Insulated conductors 14 extend from the end of the cable 12, and pass through a passage way 46 in the body portion 16. An internal taper 48 is provided at the end of the body portion 16. The internal taper 48 extends inwards to an internal shoulder 50.

A tubular adaptor 54 has an aperture therethrough to contain the insulated conductors 14. The adaptor 54 butts up against the tubular body portion 16, and has an internal taper 56, which matches with the internal taper 48 of the body portion 16, to form a sealant cavity 58. The tubular adaptor 54 has a shoulder at the same end as the internal taper 56, and a second gland nut, or threaded cover 62, passes over the tubular adaptor 54, rests against the shoulder 60, and attaches to the threaded portion 20 of the body portion 16.

At the other end of the tubular adaptor 54, an external thread 64 is provided, extending up to a shoulder 66 for connection into an explosion proof housing or for a threaded bushing to protect the insulated connectors 14.

In order to assemble the connector, the outer sheath and cable armour 40 are removed for a short length of cable 12, leaving the connectors free. Any insulating filler is stripped, leaving the insulated conductors 14 free. A portion of the sheath is removed baring the cable armour 40. The gland nut 38 is slipped over the cable, followed by the pressure ring 36. The neoprene rubber seal 24 is then positioned in such a way that it is approximately flush with the end of the cable armour 40. The insulated conductors 14 are pushed through the body portion 16, and the gland nut 38 is fitted to the body portion 16 and tightened until proper seal is achieved between the cable armour 40, and the internal curved shoulder of cavity 22, of the body portion 16.

Once this is completed, epoxy resin or other suitable sealant or cement is placed between and around the individual conductors 44 The sealant cavity 58 which is formed by the internal taper 48 of the main body portion 16, is also filled with sealant, and an additional quantity of sealant is applied. The tubular adaptor 54 is slipped over the conductors 14, pushed up so that it abuts the main body portion 16, such that the cavity 58 is now filled with sealant, be it epoxy or other type of cement. The second gland nut 62, is then fitted over the tubular adaptor 54 fitted to the exterior thread 20 on the body portion 16 and tightened so that the cement completely fills the tubular adaptor 54 around the conductors 14.

The connector 10, may be inserted into an enclosure before the epoxy resin has cured.

FIG. 3 illustrates another embodiment of a connector 10, wherein an internal seal sleeve 80, is fitted within the tubular adaptor 54, and has a tapered portion 82, which rests on the internal taper 56 of the tubular adaptor 54. A short cylindrical end portion 84 extends from the tapered portion 82, and fits within a circular groove 86 in the end of the body portion 16. The external thread 64 of the tubular adaptor 54 fits into a threaded boss 88 of an explosion proof enclosure 90 with the second gland nut 62 in place. This assembly is carried out before insertion of the electrical conductors 14. The connector 10 may be assembled on an assembly bench in much the same way as that shown in FIG. 1, except the tubular adaptor is omitted and the cement or sealant is contained within the seal sleeve 80, thus after the connector has been assembled onto an end of the cable 12, without the tubular adaptor 54. The electrical conductors 14 are slipped through the adaptor 54 and into the enclosure 90, sleeve 80 slides into the adaptor 54, and finally the second gland nut 62 is screwed onto the body portion 62 Furthermore, this system also allows removal of the connector 12 from an enclosure without having to cut the cable. The presence of the seal sleeve 80 which surrounds the hardened epoxy or cement, allows the conductors 14 to be removed and reinserted into the tubular adaptor 54, which is attached to the threaded boss 88 of an enclosure 90, and no leakage of uncured epoxy or resin or cement can take place.

Various changes may be made to the embodiments disclosed herein, without departing from the scope of the present invention, which is limited only by the following claims.

The embodiments of the invention in which an exclusive property or privilege claimed are defined as follows:

1. An electrical cable connector for sealing an armoured electrical cable entering an explosion proof enclosure, comprising:
   a rigid substantially tubular body portion with external threads at each end, the body portion having a passage therethrough for insulated conductors of an armoured electrical cable, an internal curved shoulder at one end of the body portion, and an internal taper at the other end of the body portion;
   a substantially tubular seal made from firm resilient elastomeric material, to pass over the armoured electrical cable, the seal having a substantially cylindrical inner surface, a frusto-conical outer surface extending from a small end, having a curved lip at the small end where the outer surface and the inner surface join, the curved lip adapted to match the internal curved shoulder of the body portion;

a first threaded cover means to engage the external threads at the end of the body portion with the internal curved shoulder to push against the tubular seal so that the curved lip is swivelled inwards and is adapted to contact the armoured electrical cable;

a substantially tubular adaptor to fit over the insulated conductors of the armoured electrical cable, having an internal taper and an external shoulder at one end to adjoin the end of the body portion with the internal taper to form a sealant cavity between the two internal tapers;

means for attachment to an aperture in the enclosure at the other end of the tubular adaptor, and a second threaded cover means to engage the external threads at the end of the body portion having the internal taper, to hold the tubular adaptor to the body portion.

2. An electrical cable connector according to claim 1, wherein epoxy resin is placed within the sealant cavity and the tubular adaptor.

3. The electrical cable connector according to claim 1 including an internal seal sleeve within the tubular adaptor.

4. The electrical cable connector according to claim 3, wherein the internal seal sleeve has a tapered portion at one end to contain the sealant cavity, and a cylindrical end portion extending beyond the tapered portion to fit within a circular groove in the body portion to permit the tubular adaptor and second threaded cover to be removed and leave the sleeve in place.

5. The electrical cable connector according to claim 1 including a plurality of grounding fingers fitting over the curved lip of the tubular seal, extending from the inner surface to the outer surface, the grounding fingers adapted to contact and ground the cable when the first threaded cover is tightened to the tubular body portion.

6. The electrical cable connector according to claim 1 wherein the seal is formed of conductive elastomeric material.

* * * * *